July 8, 1924.                                                      1,500,857
R. L. WOODRUFF
INSECT DESTROYING MACHINE
Filed Sept. 14, 1922          3 Sheets-Sheet 3
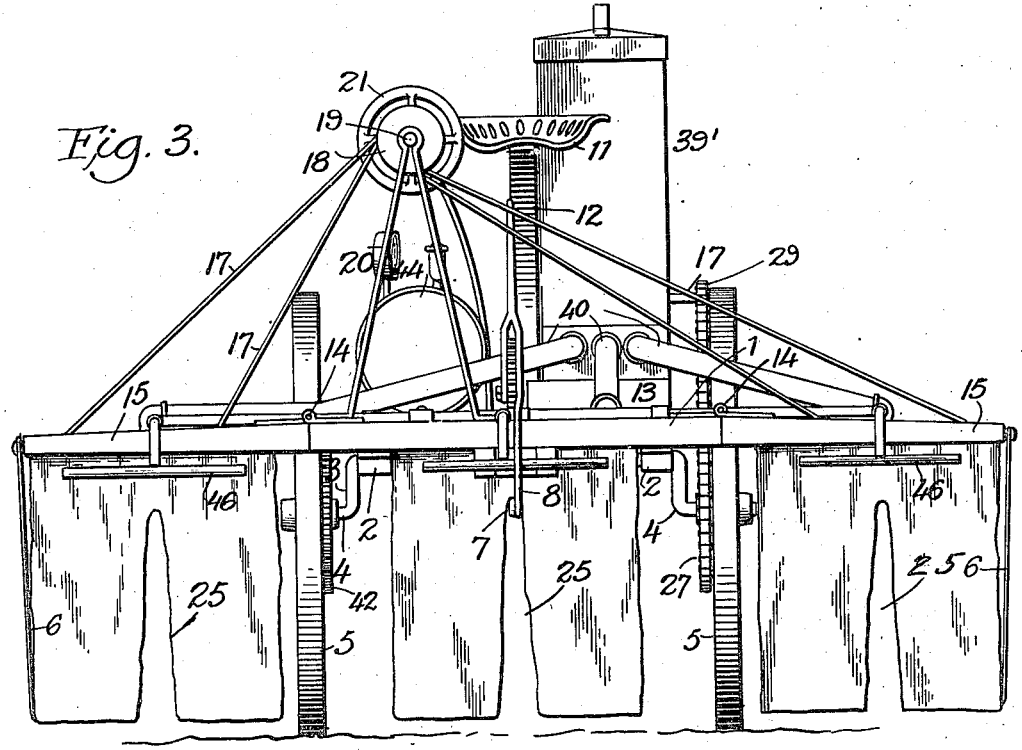
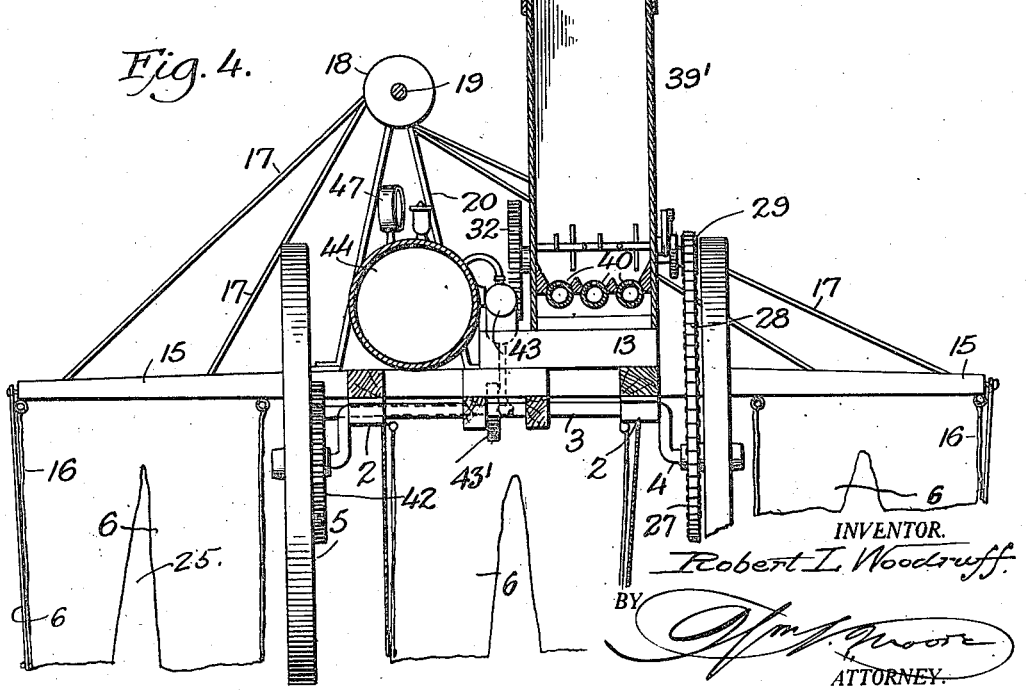
INVENTOR.
Robert L. Woodruff.
BY
ATTORNEY.

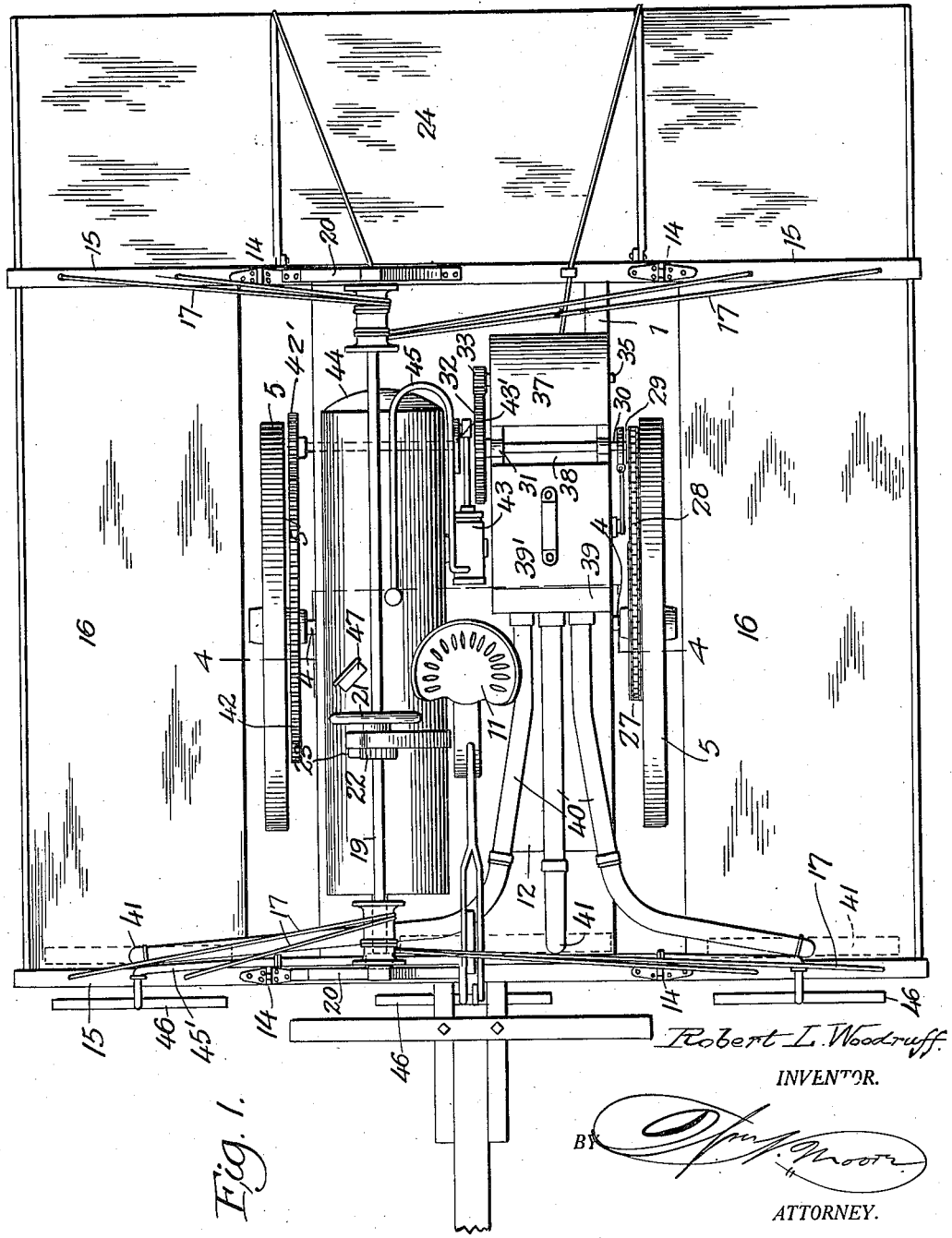

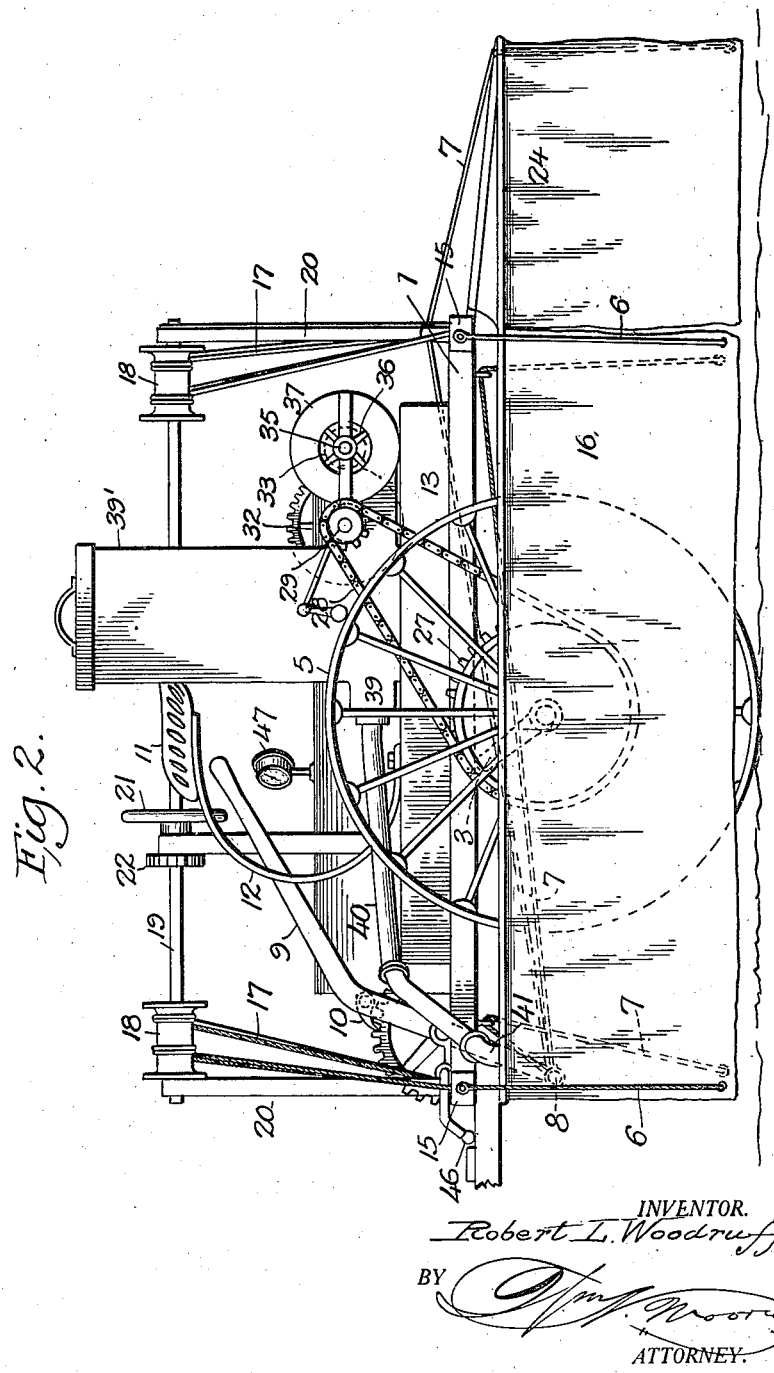

Patented July 8, 1924.

1,500,857

UNITED STATES PATENT OFFICE.

ROBERT LEE WOODRUFF, OF WINDER, GEORGIA.

INSECT-DESTROYING MACHINE.

Application filed September 14, 1922. Serial No. 588,129.

*To all whom it may concern:*

Be it known that I, ROBERT L. WOODRUFF, a resident of Winder, in the county of Barrow and State of Georgia, a citizen of the United States, have invented certain new and useful Improvements in Insect-Destroying Machines, of which the following is a specification.

My invention relates to improvements in insect-destroying machines, which, while capable of use for any purpose and under all conditions where it would perform its functions in a practical and efficient manner, is particularly constructed and designed for applying or spraying calcium arsenate upon cotton plants for the purpose of destroying or killing the boll weevil.

The main object of my invention is the production of an implement or machine which will apply the powder directly to the plant and cover the entire surface thereof, and thus overcome the defect in present machines of wasting the powder and insuring a machine which will attain great efficiency at a great saving of the powder.

Another object of my invention is the production of a machine which insures the application or spraying of the entire plant without any waste of the powder and which machine will be under easy control at all times of a single attendant.

Another object of my invention is the provision of a machine of the character and for the purpose stated which will be of light weight and draft while strong and durable; which will be comparatively simple in construction to insure the production of the machine at a fair price, and which will in all respects be thoroughly efficient and practical.

With these objects in view, my invention consists of an insect destroying implement or machine embodying novel features of construction and combination of parts for service, substantially as described and claimed, and as shown in the accompanying drawings, wherein:

Figure 1 represents a top plan view of an insect-destroying machine constructed in accordance with and embodying my invention.

Fig. 2 represents a side elevation of the complete machine.

Fig. 3 represents a front end elevation, and

Fig. 4 represents a sectional view on the line 4—4 of Fig. 1.

Referring by numeral to the drawings, in which the same numerals of reference are used to designate similar parts in all the views:

The numeral 1 designates the body or main frame of my machine, which is of open rectangular construction and has mounted therein in the depending bearing brackets 2, the axle 3, which is provided with cranked ends 4, upon which the ground wheels 5 are mounted. The frame 1 carries the driver's seat 11, which is mounted on the support 12, secured upon the base 13, itself secured to the main frame.

From this construction, it will be observed that the machine comprises a main frame which is mounted on a crank axle and to each side is hinged at 14, the side frames or sections 15, to which are connected the aprons or flexible poison confining covers 16, and to said frames are connected the cords or cables 17, which are wound upon the pair of spools 18, which are mounted on shaft 19, which is journaled in upright bearings 20, secured to the main frame, and upon said shaft is a hand-wheel 21, which is adapted to rotate the shaft 19, causing the spools to wind the cords or cables for raising and lowering the side frames or sections 15, which shaft is retained in proper position by means of the ratchet 22 and engaging pawl 23.

As shown more clearly in Fig. 2, a handle lever 9 is pivoted on the frame and adjacent to seat 11 and has the downwardly extending arm 8 to which is attached cords 7 that are secured at their ends to the lower edges of the covers 16. When it is desired to lift the covers only, the lever 9 is depressed and a pawl 10 therein holds it and the covers in any desired position.

The lower ends of the covers are also supported and strengthened at their ends by the cords 6 that hang from the side frames 15.

The rear covers 24 also have cords 7 that are connected with the lever so that the latter may lift all of the covers simultaneously.

From this construction it will be observed that to the main frame are hinged side frames which support closed apron-like sections, which serve to enclose the plants and insure the powder being deposited thereon without any waste, and further, that these side apron sections may be raised or lowered by means of the manually operated shaft, and retained in proper position, and to the rear of the main frame and to the side sections are hinged the three end apron sections 24, this construction permitting the apron sections, by reason of the slit portions 25, to admit the plant and permit passage of the plants through the slits 26 in the rear section, thus in the passage of the machine over the ground, the plants while being sprayed are entirely enclosed by the side and rear aprons, and their entire surfaces are coated with the powder and that substantially and practically no particle of said powder is permitted to go to waste.

Mounted on the hub of the right hand wheel 5 is a sprocket wheel 27 having the chain 28 that drives the small sprocket wheel 29 on the shaft 30 journaled in the boxes 31 and having at its other end the gear wheel 32 that meshes with and drives a pinion 33 on a shaft 35 that carries the fan 36 within the casing 37.

From this construction it will be apparent that rotation of the large or driving gear wheel 27, through the medium of chain 28 and sprocket wheel 29, operates the fan or blower, whose casing is connected by a conduit 38, with the lower portion 39 of the poison powder container or tank 39', from which leads the distributing pipes 40, which lead to the forward part of the machine and terminate in nozzles or spraying heads 41, which thus spray the powder to the aprons of the side sections and main frame to entirely distribute the powder over the plants.

The left hand wheel 5 carries at its hub a gear wheel 42 that meshes with and drives a pinion 42' on a shaft 21 journalled in the frame of the device. The said shaft carries at its inner end a disc 43' with a crank pin to which is secured the outer end of a piston rod of the pump 43 that is carried by the water-container or tank 44, said pump thus pumping air through the connecting pipe 45, to the tank 44, to force the water therefrom through the flexible pipes 45' to distribute the water through the nozzles or discharge ends 46, of said flexible pipes upon the plants as they are approached by the machine, said tank being provided with a suitable pressure gauge 47.

One of the most important features of my invention resides in the delivering of the water in front of the machine upon the plants before they pass under the cover or apron and spraying the poison in dry form upon the plants as soon as they pass under the apron in moist condition, thus causing the poison to completely cover and adhere to the plants.

The construction and operation of my machine will be fully understood from the drawings taken in connection with the foregoing description, and it will be apparent that the machine practically covers and encloses the plants and that the water first sprinkles the plants and immediately following the poison powder, is sprayed over the entire surface of the dampened plants and is there retained and thus the entire plant is subjected to the poison and that substantially and practically not a particle of the poison is permitted to escape and experience has proven that this machine will use only about one-fifth of the amount of powder used in machines in general use, thus overcoming a most serious effect and objections to machines in use and providing a highly efficient, useful and practical machine of this character.

It will be noted that my machine delivers the water upon the plants beyond or in advance of the frame of the machine, thus causing the plants to pass under the aprons in a wet state to receive and retain the poison powder which is discharged at the front of the machine within the aprons and in rear of the water delivery means, and this is one of the most important operations of my machine as the plants pass under the aprons in a wet condition and are entirely covered with the powder which sticks to the plants by reason of their wet condition.

I claim:

1. An insect-destroying machine, consisting of a main frame, adjustable side and end frames, aprons carried by said side and end frames and connected to the frame to form an entire closure around said frame, and means for distributing water on the cotton before passing under said aprons and means arranged in rear of said water distributing means for delivering poison under said aprons on the cotton.

2. An insect destroying machine, consisting of a main frame, a crank axle connected to said frame, supporting wheels on said axle, adjustable side and end frame connected with the main frame, enclosing aprons carried by said frames, and means for raising and lowering said frames and aprons simultaneously and retaining them in adjusted positions.

3. An insect destroying machine, consisting of a main frame, a crank axle connected to said frame, supporting wheels on said axle, adjustable side and end frames connected with the main frame, enclosing aprons carried by said frames, means for raising and lowering said aprons and retaining them in adjusted positions, means for distributing water to the forward part and in advance of the main and side frames, and means for distributing poison within the aprons and in rear of the water distributing means.

4. An insect destroying machine, consisting of a main frame, side and end closing aprons carried by said frame, means for raising and lowering said aprons and retaining them in proper position, an axle mounted in said frame, wheels on said axle, a gear wheel carried by said axle, and means operated by said gear wheel for distributing water upon the plants in advance of the machine and poison under the closure formed by said aprons when in lowered position.

5. An insect-destroying machine, consisting of a frame, aprons mounted on the sides and ends of said frame and capable of being raised out of the way and lowered to form a closure about said frame, and means carried by the frame to distribute poison within said closure and means also carried by the frame for delivering water upon the plants in advance of said poison distributing means.

6. An insect-destroying machine, consisting of a frame, aprons mounted on the sides and ends of said frame and capable of being raised out of the way and lowered to form a closure about said frame, and means carried by the frame to distribute poison within said closure and means for distributing water in advance of said closure, said end aprons being formed with slits to allow passage over the plants as the machine travels.

7. An insect destroying machine comprising a supporting frame having driving wheels, hinged frames carried at the sides and rear of the supporting frame, aprons hung from the hinged frames and forming inclosures, means for elevating and lowering the hinged frames and aprons, water spraying means operated by one of the driving wheels and delivering the water upon the plants in advance of the machine, and powder delivering and spraying means operated by the other driving wheel and spraying the poison in the form of powder in rear of the water delivering means upon the moistened plants.

8. An insect destroying machine comprising a main frame and supporting wheels, side and end hinged frames carrying aprons and covers to form closures with slitted front and rear ends, means for simultaneously raising and lowering the hinged frames and aprons, means for spraying powder within the closures, driving means operated by one of the wheels for the spraying means, a water tank to supply liquid sprays in advance of the closures, a pump driven by the other wheel and adapted to operate the liquid sprays, a container for the powder, and an agitator in the container and actuated in connection with the powder spraying means.

In testimony whereof I hereunto affix my signature.

ROBERT LEE WOODRUFF.